United States Patent [19]
Cahen

[11] Patent Number: 5,948,313
[45] Date of Patent: Sep. 7, 1999

[54] MOLD ASSEMBLY FOR MAKING A SHELL, IN PARTICULAR AN EDIBLE SHELL

[75] Inventor: Philippe Cahen, Paris, France

[73] Assignee: Sarl "OPTOS-OPUS", Paris, France

[21] Appl. No.: 08/907,900

[22] Filed: Aug. 11, 1997

[30] Foreign Application Priority Data

Feb. 3, 1997 [FR] France ................................. 97 01159

[51] Int. Cl.[6] .................................................. B41B 11/54
[52] U.S. Cl. .......................... 249/160; 249/163; 249/168; 425/394; 99/432
[58] Field of Search .................................. 249/160, 163, 249/168, DIG. 1, 144; 425/383, 394, 412, 416, 2; 99/432, 433, 439; 264/DIG. 30

[56] References Cited

U.S. PATENT DOCUMENTS

| | | | |
|---|---|---|---|
| 987,525 | 3/1911 | Wing ........................................... | 99/439 |
| 1,472,229 | 10/1923 | Plempel .................................... | 425/412 |
| 3,618,179 | 11/1971 | Anderson et al. ....................... | 425/412 |
| 3,867,501 | 2/1975 | Powers et al. ........................... | 264/219 |
| 5,118,380 | 6/1992 | Gatarz et al. ............................ | 425/412 |
| 5,226,352 | 7/1993 | Savage .................................... | 249/163 |
| 5,492,664 | 2/1996 | Cutts ....................................... | 264/156 |

FOREIGN PATENT DOCUMENTS

WO 92/15199 9/1992 WIPO.

Primary Examiner—Jay H. Woo
Assistant Examiner—Robert A. Hopkins
Attorney, Agent, or Firm—Sixbey, Friedman Leedom & Ferquson; Staurt J. Friedman

[57] ABSTRACT

A mold assembly including an outer mold and an associated inner mold, the inner mold being organized to engage in the outer mold, the outer mold having a curved main portion with a central opening and an outer rim extending in a plane, and the inner mold having a curved main portion with a central chimney shaped to pass with small clearance through the opening and an outer rim which, when the molds are mutually engaged, is coplanar with the outer rim of the outer mold and co-operates therewith to close the molding space defined between the curved portions.

15 Claims, 3 Drawing Sheets

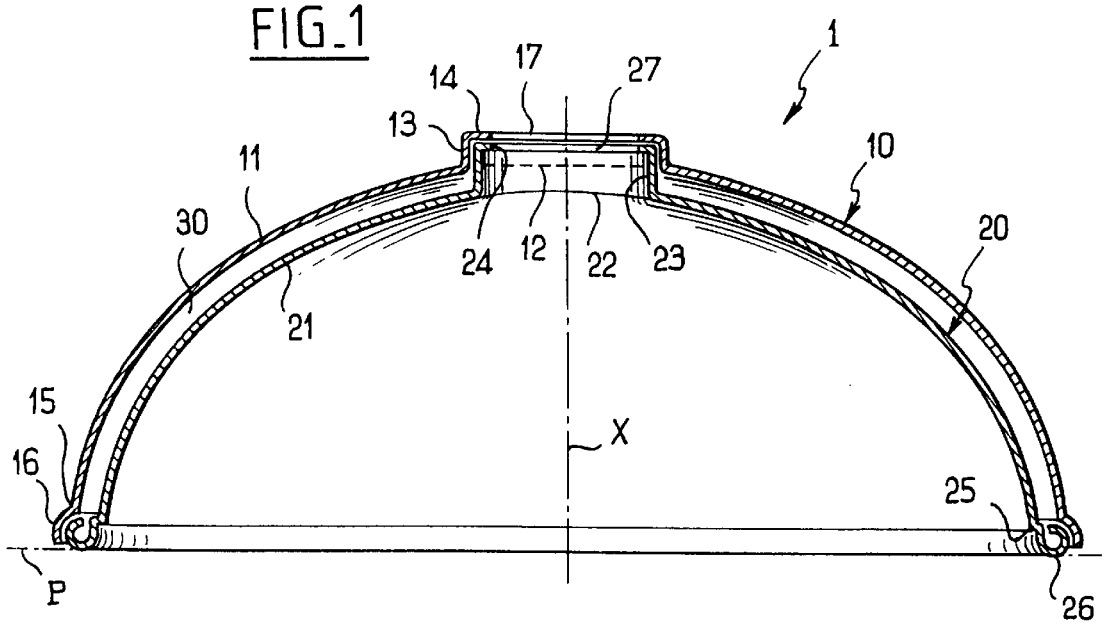
FIG_1
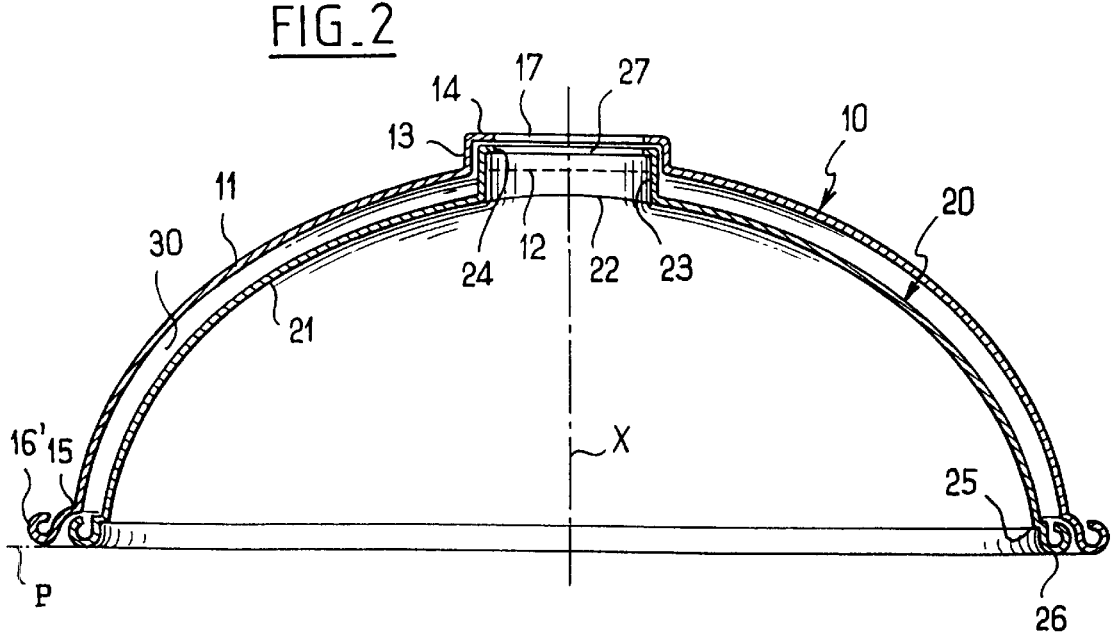
FIG_2

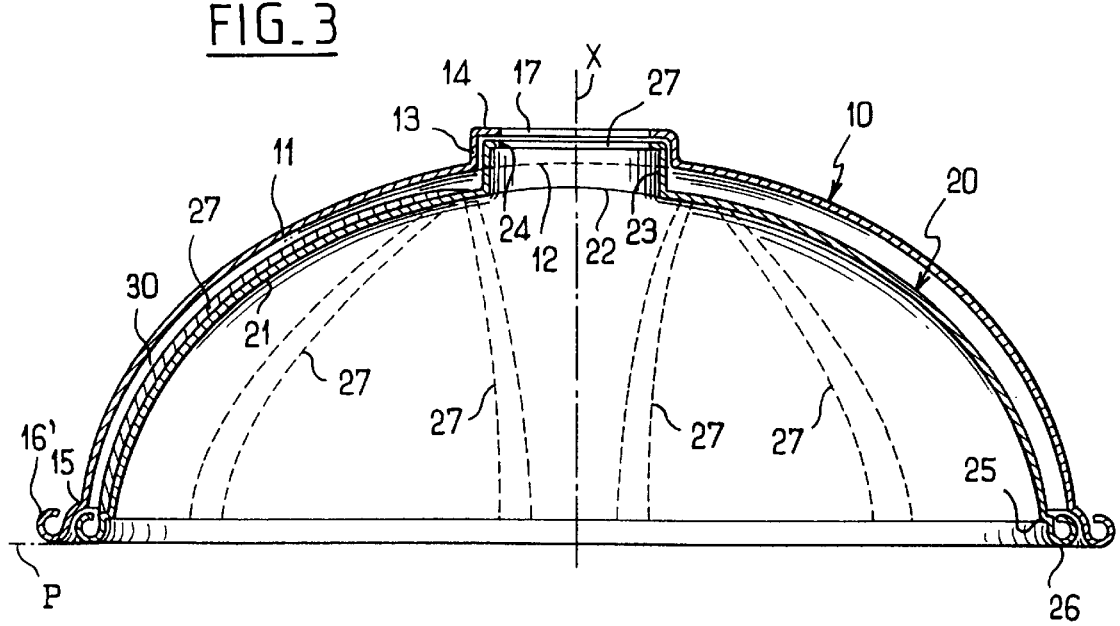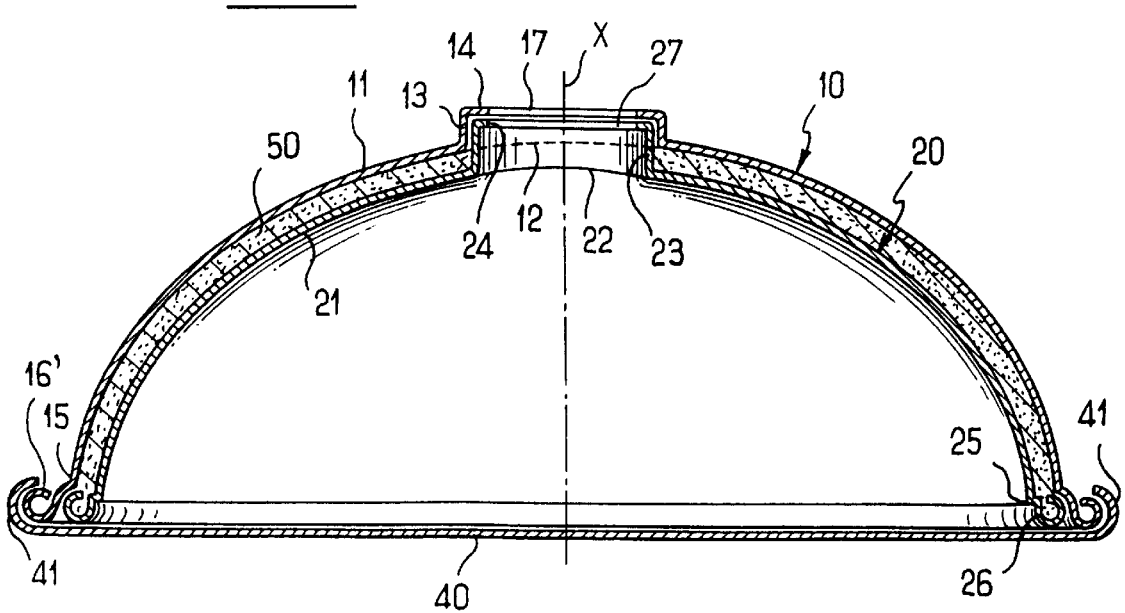

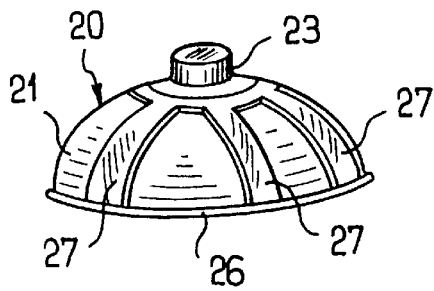
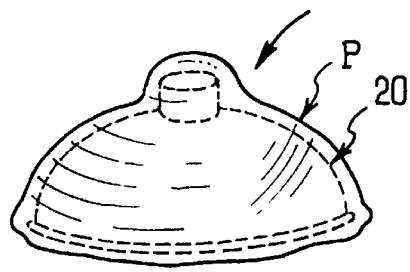
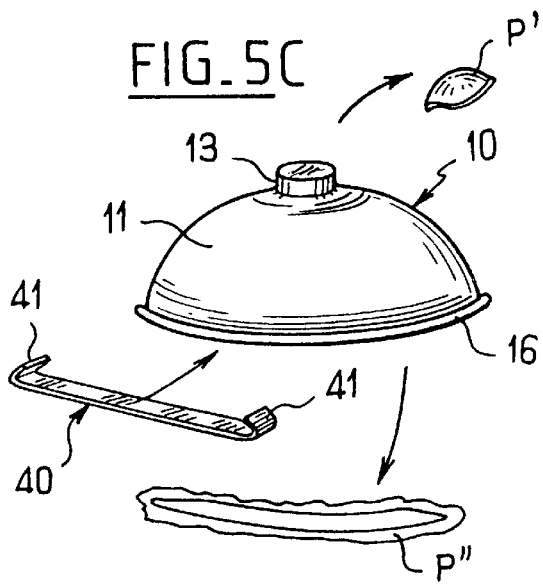
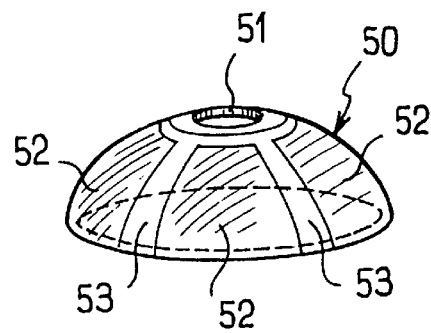
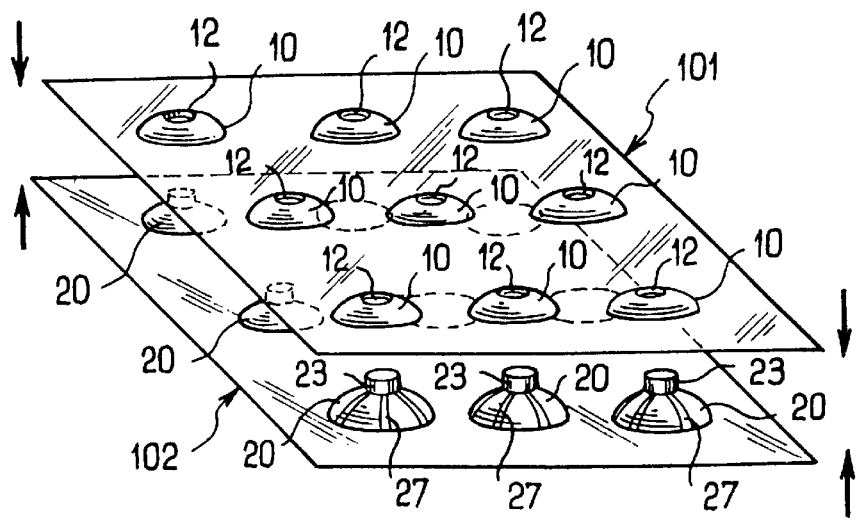

MOLD ASSEMBLY FOR MAKING A SHELL, IN PARTICULAR AN EDIBLE SHELL

The present invention relates to a mold assembly for making a shell, in particular an edible shell or "case".

BACKGROUND OF THE INVENTION

To make a shell that is thin, it is known that a mold in the shape of a curved receptacle can be used with the inside face thereof being covered in a paste such as pastry, dough, or the like which is spread by hand so as to achieve substantially uniform thickness, and the assembly then being allowed to cook. Depending on circumstances, various solid elements are then applied to the outside face of the paste (fruit stones, dried vegetables, grains of rice) to prevent the paste from rising while it is being cooked. Nevertheless, that is very much a hand-craft technique, and completely incompatible with industrial scale operation.

Also, if it is desired to make a shell with a central opening, it is then necessary to shape the shell by hand after it has been cooked, with the risk of the cooked paste crumbling around the edges of the opening. Such a shell with a central opening is particularly advantageous, for example, when it is desired to make a food article, in particular a preparation in the form of a dome having a light source such as a candle located inside it.

OBJECTS AND SUMMARY OF THE INVENTION

The invention seeks specifically to solve this problem by designing a mold assembly which can be used for making a shall of the above-specified type, which is simultaneously lightweight, cheap to manufacture, and suitable for use on an industrial scale.

A particular object of the invention is thus to provide a mold assembly specifically adapted to making a shell, in particular an edible shell, having a wall which is thin enough to be translucent to a certain extent, and which has a central opening, said assembly being simple in structure and lightweight while also being suitable for use with a very wide variety of raw materials for making the molded shell.

This problem is solved by the invention by means of a mold assembly comprising an outer mold and an associated inner mold organized to engage in the outer mold and to co-operate therewith to define a molding space, the outer mold having a curved main portion with a central opening and with an outer rim extending in a plane, and the inner mold having a curved main portion with a central chimney configured to pass with a small amount of clearance through the opening of the outer mold and with an outer rim which, when the inner mold is engaged in the outer mold, is substantially coplanar with the outer rim of the outer mold and co-operates therewith to close the molding space.

Thus, when the inner mold is engaged in the outer mold, the molding space is of constant thickness over the entire periphery of the mold, and it is closed at the central opening of the outer mold and at the two adjacent outer rims which are situated in a common plane.

Preferably, the outer mold has a chimney at its central opening, which chimney is similar in shape to the chimney of the inner mold. By engaging the two chimneys one in the other, it is possible to ensure that one mold is accurately centered relative to the other.

It may be advantageous to provide for the chimney(s) to be open at the top and have respective inwardly-directed rims at their free end edges.

According to another advantageous characteristic, the outer rim of the inner mold is rolled up, and the outer rim of the outer mold is shaped to bear against and to center itself on the rolled-up rim of the inner mold when the inner mold is engaged in the outer mold. Preferably, the outer rim of the outer mold has a step which co-operates with the rolled-up rim of the inner mold to cut the molded material present in the molding space. Thus, at the adjacent outer edges, a sharp cut is obtained at the peripheral edge of the molded shell.

In some cases, it may be desirable to obtain a shell with translucence that varies, this serving in association with a light source disposed inside the shell to obtain an esthetic effect, the light source being in register with the central opening of the shell. The mold assembly may then have a specific characteristic for this purpose whereby the main portion of the inner mold has, on its convex face, portions in relief that locally reduce the thickness of the molding space. These portions in relief generate same-shape zones on the molded shell that are of reduced thickness and consequently of greater translucence.

The portions in relief may be fixed, and in particular may be welded, to the convex face of the main portion of the inner mold. They may also be added to said convex face in removable manner, and in particular they can then be made of a flexible material, in particular silicone. In another variant, these portions in relief may be the result of locally stamping the main portion of one of the molds, and in particular of the inner mold. In all cases, it is possible to provide for the portions in relief to form a pattern covering the entire periphery of the inner mold.

According to another advantageous characteristic of the invention, the mold assembly includes a locking strip whose ends are shaped to hook onto the outer rim of the outer mold in order to be capable of temporarily securing the outer mold and the inner mold while they are mutually engaged. Such a strip makes it possible to hold the positioning of one mold relative to the other while the paste is cooking, overcoming any thrust exerted by the paste in the event of it swelling.

According to another advantageous characteristic, the mold assembly can be adapted for use on an industrial scale. To this end, it is made in the form of two corresponding plates, one of which has a plurality of outer molds and the other of which has a plurality of inner molds, said plates being superposable so that the inner molds engage simultaneously in the associated outer molds.

BRIEF DESCRIPTION OF THE DRAWINGS

Other characteristics and advantages of the invention appear more clearly in the light of the following description relating to a particular embodiment and given with reference to the figures of the accompanying drawings, in which:

FIG. 1 is an axial section through a molding assembly in which the inner mold is engaged in the outer mold;

FIG. 2 shows a variant in which the outer rim of the outer mold is also rolled up;

FIG. 3 shows another variant in which the inner mold has portions in relief locally reducing the thickness of the molding space;

FIG. 4 shows the molding assembly of FIG. 2 in which the molding space is occupied by pastry that is to constitute a shell, the two molds being locked together by a transverse strip;

FIG. 5 is a diagram showing the successive steps for obtaining a molded shell having zones that are locally more translucent; and FIG. 6 is a perspective view of a molding assembly implemented in the form of two superposable matching plates, for the purpose of applying the invention on an industrial scale.

MORE DETAILED DESCRIPTION

FIG. 1 shows a molding assembly 1 serving in particular to make a shell, in particular an edible shell or "case", the molding assembly essentially comprising an outer mold referenced 10 and an inner mold referenced 20, the inner mold being organized to engage inside the outer mold 10 and to co-operate therewith to define a molding space referenced 30. The outer mold 10 is in the form of a seamless unitary piece, having a curved main portion 11 with a central opening referenced 12, and an outer rim 16 lying in a plane referenced P. Specifically, although not necessarily, the outer mold 10 is constituted by a surface of revolution about an axis referenced X, the above-mentioned plane P then being substantially orthogonal to the axis X. The inner mold 20 is likewise constituted by a seamless unitary piece, having a curved main portion 21 of an outline that is similar to that of the curved main portion 11 so as to leave a molding space 30 of uniform thickness over the entire periphery of the mold assembly 1, said main portion 21 having a central opening 22 surmounted by a central chimney 23 which is shaped to pass with small clearance through the opening 12 of the outer mold 10. The term "chimney" is used herein to refer to the shape of this central projection. It should be observed in particular, that the top of the chimney may be open, as shown in the figures, or it may be closed. The inner mold 20 also has an outer rim 26 which, when the inner mold is engaged in the outer mold, is substantially coplanar with the outer rim 16 of the outer mold, i.e. lies in above-specified plane P, and it co-operates therewith to close the molding space 30.

The assembly made in this way makes it possible to obtain a molded shell of constant thickness, that is of regular circularly-symmetrical shape, with this being made possible by one of the mold elements being centered relative to the other in order to achieve proper positioning relative to the axis X, and by one of the mold elements bearing against the other in a direction parallel to the axis X in order to achieve constant thickness over the entire periphery of the mold assembly. This constant thickness is preferably selected to be small enough for the molded shell to be translucent to some extent.

With such a molding assembly of the invention, the user merely places a thickness of paste on the inner mold while it is resting via its outer rim on a support surface, and then covers the inner mold that has been coated in this way with the outer mold, thereby cutting off the material in the region of the X axis by co-operation between the opening 12 in the outer mold 10 and the chimney 23 on the inner mold 20, in the manner of a punch. A sharp cut is thus obtained which is of accurately controlled outline which, in this case, is circular. Although not essential, provision can be made as shown herein for the outer mold 10 to have in the vicinity of its central opening 12 a chimney 13 corresponding to the chimney of the inner mold 20. The top of the chimney 13 is preferably open with a large opening as shown, or else with a small central hole. In this way, when the two molds are mutually engaged, the inner chimney 23 slides like a piston in the outer chimney 13, thereby not only cutting the paste, but also ensuring accurate positioning relative to the axis X. Provision can be made for the chimney 23 or for both chimneys 13 and 23 to have respective inwardly-directed rims 14 and 24 at their free end edges. Such inwardly-directed rims serve to close more cleanly the top zone of the molding space 30. The inwardly-directed rims 14 and 24 define two superposed openings 17 and 27 that are coaxial about the axis X.

In the bottom portion of the mold assembly shown, it can be seen that the bottom rim 26 is rolled up and that the bottom rim 16 is shaped to bear against and center itself on, the rolled-up rim 26 when the inner mold 20 is engaged in the outer mold 10. Specifically, the outer rim 16 of the outer mold 10 has a step 15 which co-operates with the rolled-up rim 26 of the inner mold 20 to cut the molded material present in the bottom portion of the molding space 30. Beyond this step 15, there is a curved surface covering a portion of the rolled-up rim 26, said circularly symmetrical surface having a profile that occupies substantially one-fourth of a circle in the present case. This provides co-operation between the outer rim 16 and the rolled-up rim 26, both for the purpose of providing axial abutment of one mold against the other in the direction X, and also for providing relative centering of the two molds at their end edges. This ensures that the molding space has the same thickness from one end to the other of the molding assembly.

Each mold is preferably made as a single piece, i.e. it is seamless, from a material such as tin-plate, aluminum, or steel. The curved shape shown herein is a shape that is slightly flattened obtained by juxtaposing two portions of spheres of different radiuses, the top portion adjacent to the pair of chimneys having a radius of curvature that is greater than twice the radius of curvature provided in the vicinity of the outer rims.

FIG. 2 shows a variant of the molding assembly 1 as described above, with the only difference, in fact, lying in the configuration of the outer rim of the outer mold 10. Beyond the step 15, this outer rim has an extension forming a rolled-up rim referenced 16', with the bottom face thereof being coplanar with the bottom face of the rolled-up rim 26 of the inner mold 20. Thus, in addition to performing the functions of providing a stop and centering, this also provides the possibility of controlling thrust appropriately because of the accurately coplanar nature of the two rolled-up rims. In a variant, provision can be made for the rolled-up rim 26 to be rolled in the opposite direction and for it to terminate in the form of a substantially rectilinear reentrant portion; this makes it easier to obtain accurately coplanar positioning. As explained below, this configuration makes it easier, in particular, to use a locking strip for temporarily holding together the outer mold and the inner mold once they have been engaged one within the other.

FIG. 3 shows a variant in which the main portion 21 of the inner mold 20 has portions in relief 27 on its convex face for locally reducing the molding thickness 30. These portions in relief 27 can be fixed on the convex face of the main portion of the inner mold 20, and in particular they can be welded thereon. They can also be fitted to said convex shape in removable manner, and in particular they can then be made from a flexible material facilitating positioning thereof and cleaning thereof, for example they can be made of silicone. In another variant, the portions in relief 27 can be the result of locally stamping the main portion of one of the molds, and in particular of the inner mold 20.

In all cases, the portions in relief 27 make it possible locally to reduce the thickness of the molded paste, and consequently to confer local variations in the translucence of a given molded shell. By way of example, provision can be made for the portions in relief 27 to form a pattern covering the entire periphery of the inner mold 20, as shown in FIG.

3, which pattern can also be formed from an add-on unitary element in the form of a ring or a mesh, e.g. made of silicone, and as shown in FIG. 5. Such a pattern may, for example, represent the stripes present on a pumpkin or on a ball, thereby imparting a very specific appearance when the shell is used together with a source of light such as a candle located inside the dome and lighting the entire shell from the inside, thus showing up the different degrees of translucence in a manner that is quite surprising. Such an assembly is particularly suitable for Halloween parties during which it is traditional to empty out a pumpkin and place a candle inside it. As will easily be understood, the central opening in the shell serves in particular to evacuate heat when such a candle is used for lighting purposes, without any risk of locally damaging the shell by burning it.

FIG. 4 shows the molding assembly of FIG. 2 in which the molding space is filled with paste 50. In some cases, it can happen that the paste held between the two curved surfaces of the molds inflates on being cooked, thereby exerting force that tends to move the molds apart from each other, and thus running the risk of giving rise to differences in thickness and irregularities in the relief on the molded shell. To avoid that drawback, and as shown in FIG. 4, it is advantageous to use a locking strip, referenced 40, with raised ends 41 shaped to hook onto the outer rim 16 or 16' of the outer mold 10 so as to make it possible temporarily to secure the outer mold 10 and the inner mold 20 in a mutually-engaged configuration. For this purpose, it is preferable to use a strip having a certain amount of strength, e.g. made of steel.

By way of indication, for use with pastry, it is possible to use a molding assembly in which the rim has a diameter of about 180 mm and a height of about 70 mm, the thickness of the molding space being 4 mm and being reduced to a value in the range 2 mm to 2.5 mm in register with the optional portions in relief.

FIG. 5 is a diagram showing the successive steps making it possible to obtain the desired shell with a central opening:

a) The operator places the inner mold 20 so that its outer rim 26 rests on a support surface, with its chimney 23 (having a closed top in this case) thus pointing upwards. It will be observed that portions in relief 27 are present on the convex face of the mold, i.e. on the outside thereof, thus providing a pattern that occupies the entire periphery of the mold, which pattern may be added on and made out of a flexible material such as silicone.

b) The operator covers the inner mold 20 with a thickness of paste P.

c) The operator then covers the paste-coated inner mold with the outer mold 10, thereby cutting off the top portion of the paste at the chimney 23, as represented by a cap P', and also cutting off any excess paste at the outer rims, as presented by a ring P''. Once the two molds are in position, the operator can, if necessary, install a strip 40 having raised ends 41 that clip over the rolled-up outer rim 16. The assembly can then be put into the oven to cook the paste, with the position of the mold being of little importance insofar as the paste is accurately held via both faces within the associated molding space.

d) After cooking and unmolding, a shell 50 is thus obtained which has a central opening 51 and zones 52 of uniform thickness separated by zones 53 of smaller thickness, which zones are thus more highly translucent when a source of light is located inside the shell.

Although not shown, it is naturally possible during step c) to place the mold assembly on top of a traditional mold of the cake tin or pan type having the same diameter, so as to form a pastry item constituted by cake filling (in the tin or pan) covered by a dome having a central opening.

When used on an industrial scale, it is naturally possible to make a multitude of shells of the above type simultaneously.

As shown in the variant of the invention illustrated by FIG. 6, it is then advantageous to make the mold assembly in the form of two matching trays or plates 101 and 102, one of which (plate 101) has a plurality of outer molds 10 of the above type, while the other of which (plate 102) has a plurality of associated inner molds 20 likewise of the above type. The two plates 101 and 102 are organized to be superposable, as represented by arrows in FIG. 6 so that the inner molds 20 engage simultaneously in the associated outer molds 10. Under such circumstances, the outer rims of the molds are integrated in the planes of the plates or project slightly relative therefrom. The two assembled-together plates shown herein have nine pairs of molds. However that is naturally purely by way of example.

The above-described molding assembly can be used with a very wide range of materials to constitute the paste that forms the molded shell. In pastry making, it is advantageous to use a puff pastry which is more advantageous for the transparent effect than is a shortcrust pastry or a sugarcrust pastry. It is also possible to use dough for unleavened bread or sugar or indeed rice pastry. The invention also seeks to cover an application to making a shell having a central opening formed in a material that is not edible but that is of similar consistency, such as papier maché, in particular for making a shell constituted a decorative lantern or fairy-light whether or not associated with an edible portion.

The invention is not limited to the embodiments described above, but on the contrary it covers any variant using equivalent means to reproduce the essential characteristics specified above.

I claim:

1. A mold assembly comprising a substantially rigid outer mold and an associated substantially rigid inner mold organized to engage in the outer mold and to co-operate therewith to define a molding space, the outer mold having a curved main portion with a central opening and with an outer rim extending in a plane, and the inner mold having a curved main portion with a central chimney configured to pass with a small amount of clearance through the opening of the outer mold and with an outer rim which, when the inner mold is engaged in the outer mold, is substantially coplanar with the outer rim of the outer mold and co-operates therewith to close the molding space, wherein the main portion of the inner mold has, on it convex face, portions in relief that locally reduce the thickness of the molding space, whereby any edible shell molded by said mold assembly has a translucence that increases in zones of reduced thickness.

2. A mold assembly according to claim 1, wherein the outer mold has a chimney at its central opening, which chimney is similar in shape to the chimney of the inner mold.

3. A mold assembly according to claim 2, wherein both chimneys are open at the top and have respective inwardly-directed rims at their free end edges.

4. A mold assembly according to claim 1, wherein the outer rim of the inner mold is rolled up, and the outer rim of the outer mold is shaped to bear against and to center itself on the rolled-up rim of the inner mold when the inner mold is engaged in the outer mold.

5. A mold assembly according to claim 4, wherein the outer rim of the outer mold has a step which co-operates with the rolled-up rim of the inner mold to cut the molded material present in the molding space.

6. A mold assembly according to claim 1, wherein the portions in relief are fixed to the convex face of the main portion of the inner mold.

7. A mold assembly according to claim 1, wherein the portions in relief are added in removable manner to the convex face of the main portion of the inner mold.

8. A mold assembly according to claim 7, wherein the portions in relief are made from a flexible material.

9. A mold assembly according to claim 1, wherein the portions in relief are local outwardly protruding stamped parts of the main portion of the inner mold.

10. A mold assembly according to claim 1, wherein the portions in relief form a pattern covering the entire periphery of the inner mold.

11. A mold assembly according to claim 1, including a locking strip whose ends are shaped to hook onto the outer rim of the outer mold in order to be capable of temporarily securing the outer mold and the inner mold while they are mutually engaged.

12. A mold assembly according to claim 1, made in the form of two corresponding plates, one of which has a plurality of outer molds and the other of which has a plurality of inner molds, said plates being superposable so that the inner molds engage simultaneously in the associated outer molds.

13. A mold assembly according to claim 6 wherein the portions in relief are welded to the convex face of the main portion of the inner mold.

14. A mold assembly according to claim 8 wherein the portions in relief are made from silicone.

15. A mold assembly according to claim 1, wherein the chimney is closed at a top portion thereof.

* * * * *